United States Patent [19]
Patilla

[11] Patent Number: 5,145,126
[45] Date of Patent: Sep. 8, 1992

[54] ENGINE NACELLE

[75] Inventor: Richard G. Patilla, Derby, England

[73] Assignee: Rolls-Royce plc, London, United Kingdom

[21] Appl. No.: 756,554

[22] Filed: Sep. 9, 1991

[30] Foreign Application Priority Data

Nov. 16, 1990 [GB] United Kingdom ............... 9025023

[51] Int. Cl.$^5$ ............................................. B64D 29/00
[52] U.S. Cl. ............................... 244/53 B; 60/226.3; 137/15.1
[58] Field of Search ...................... 244/53 B; 137/15.1, 137/15.2; 60/226.3, 226.1, 263

[56] References Cited

U.S. PATENT DOCUMENTS

| | | | |
|---|---|---|---|
| 2,631,425 | 3/1953 | Nordfors | 244/53 B |
| 2,960,281 | 11/1960 | Jumelle et al. | 244/53 B |
| 2,999,656 | 9/1961 | Ward | 244/53 B |
| 3,222,863 | 12/1965 | Klees et al. | 244/53 B |
| 3,618,876 | 11/1971 | Skidmore et al. | 244/53 B |
| 3,736,750 | 6/1973 | Britt | 137/15.1 |
| 3,750,689 | 8/1973 | Britt | 244/53 B |
| 4,012,165 | 3/1977 | Kraig | 60/226.1 |
| 4,132,240 | 1/1979 | Frantz | 244/53 B |

FOREIGN PATENT DOCUMENTS

| | | | |
|---|---|---|---|
| 1066428 | 12/1960 | Fed. Rep. of Germany | 137/15.2 |
| 1626126 | 10/1973 | Fed. Rep. of Germany | 244/53 B |
| 66880 | 2/1940 | Switzerland | 244/53 B |
| 1228806 | 4/1971 | United Kingdom | 137/15.1 |

Primary Examiner—Jesûs D. Sotelo
Assistant Examiner—Anne E. Bidwell
Attorney, Agent, or Firm—Oliff & Berridge

[57] ABSTRACT

A nacelle for a gas turbine engine (10) defines an air intake which is capable of meeting all the engine airflow requirements. The nacelle comprises a cowling (22), fixed upstream and in spaced apart relationship from an engine cowling (16), to define an annular passage (30) therebetween. Each of the cowlings, (22) and (16), have an air intake, (24) and (20) respectively, through which the mainstream flow of air passes into the engine (10). Depending upon the amount of airflow the engine (10) demands at different operating flight conditions air can flow in either direction through the passage (30). The flow in either direction through the passage (30) enables optimisation of both the internal and external nacelle requirements at all the different engine airflow requirements.

9 Claims, 3 Drawing Sheets

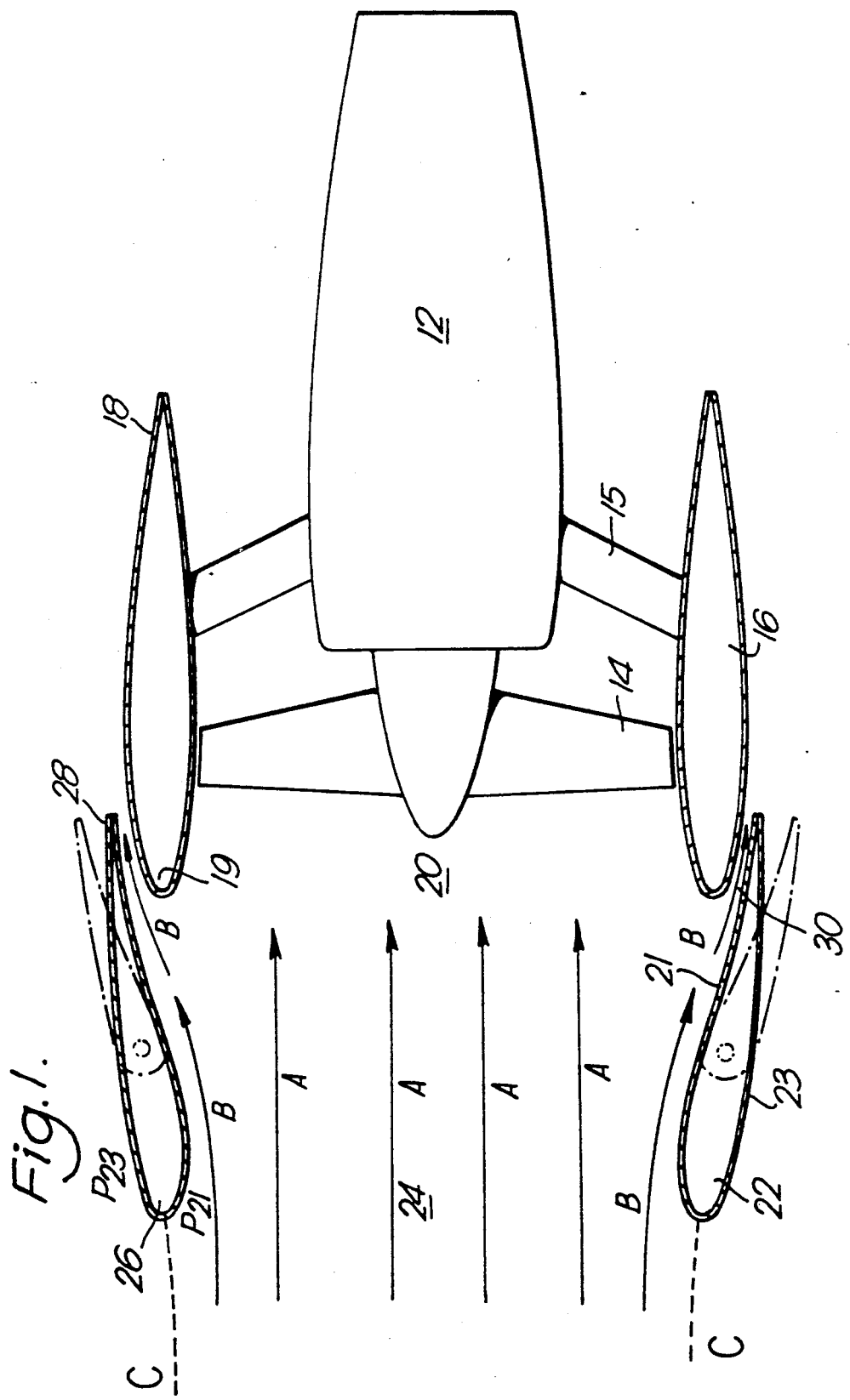

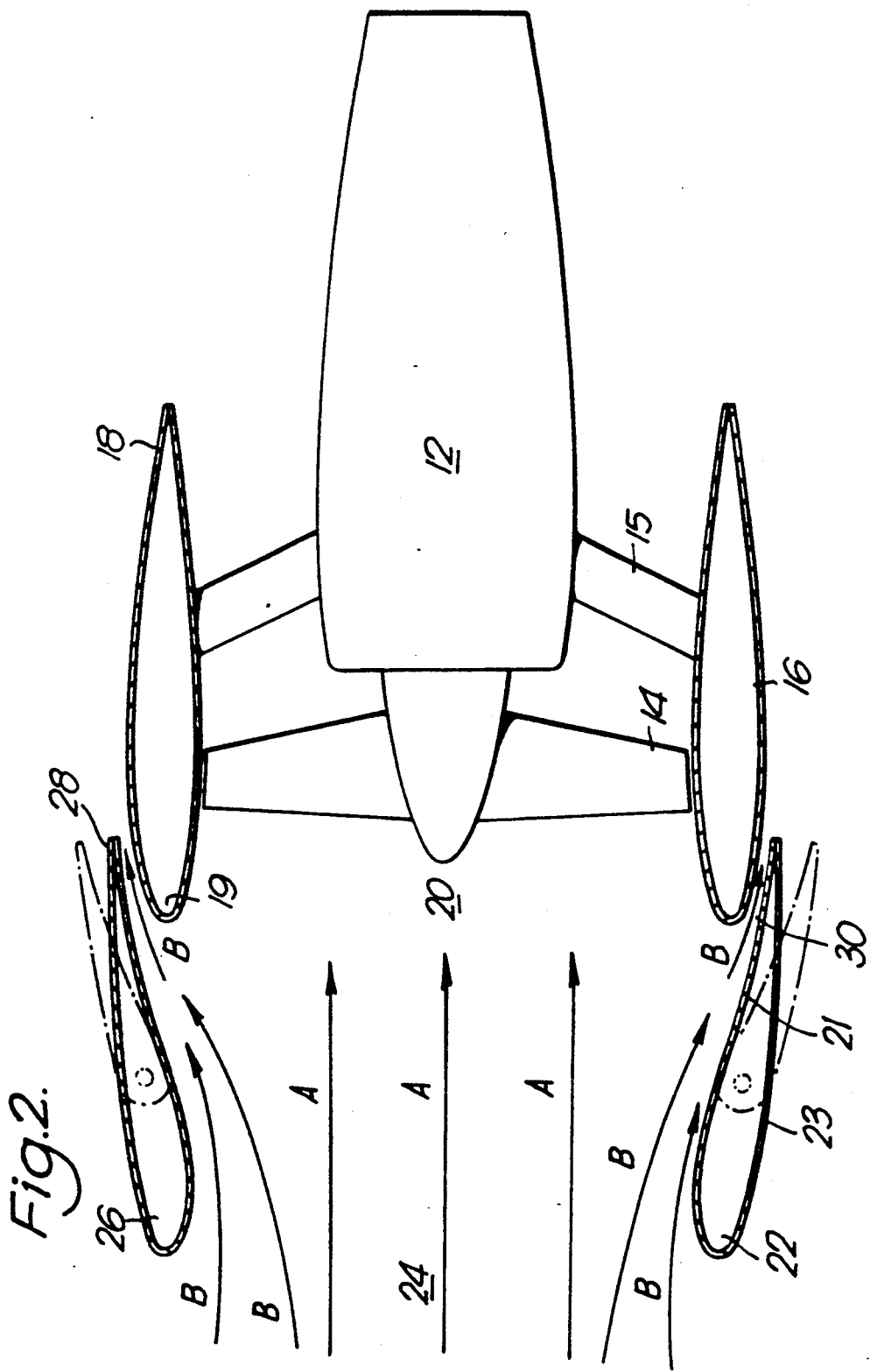

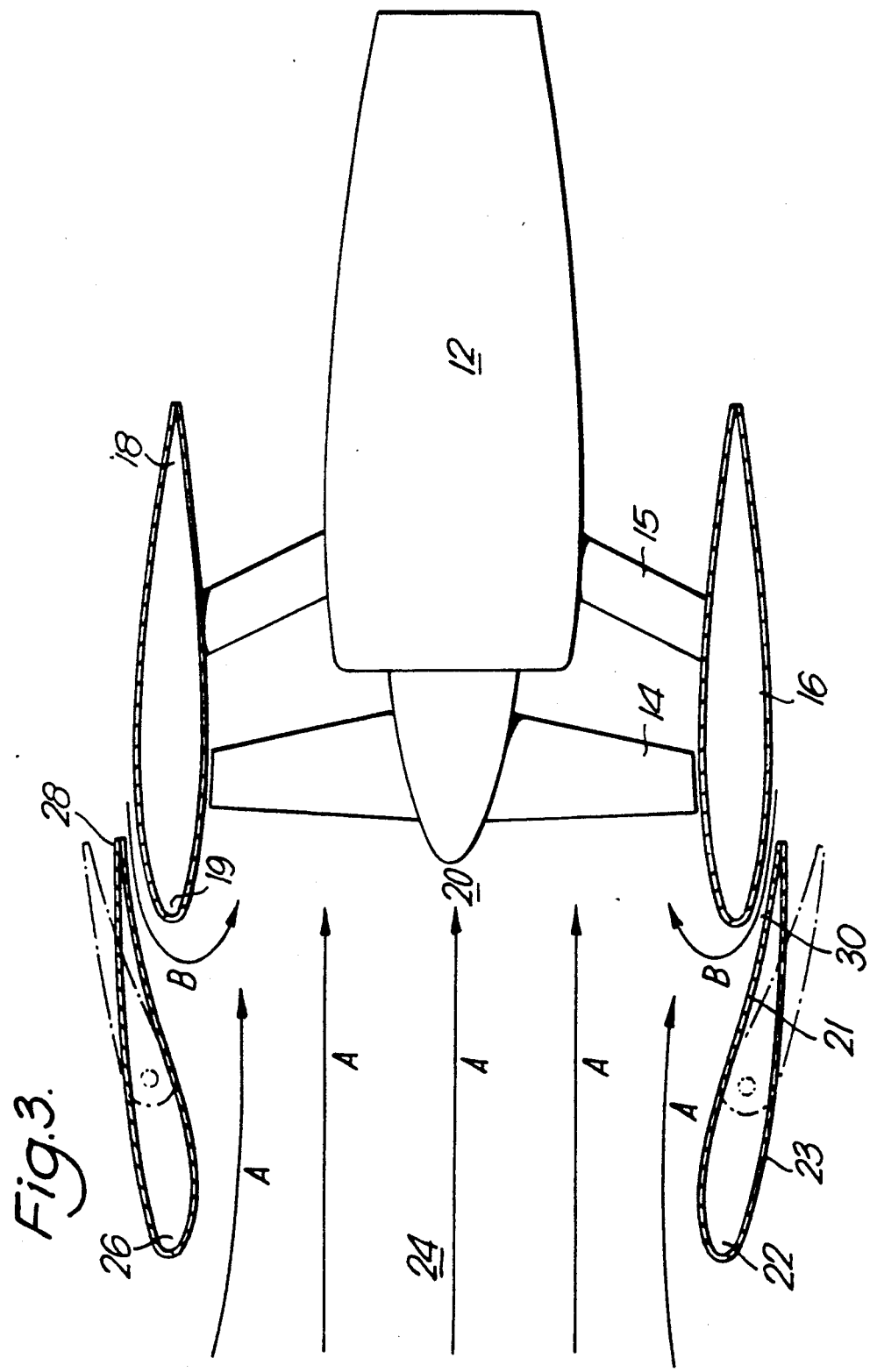

ENGINE NACELLE

The present invention relates to a nacelle for a gas turbine engine and in particular to a nacelle which defines an air intake capable of meeting all the engine airflow requirements more efficiently than a conventional air intake.

The design of nacelles for gas turbine engines used in aero applications is a compromise between internal performance, external drag and weight. The nacelle must define an air intake which is able to pass the maximum airflow requirement that the engine demands. However the overall size of the nacelle needs to be kept small to minimise the amount of drag on the external surfaces of the nacelle. To meet these criteria conventional nacelles are designed to offer a reasonable compromise in the internal and external performance to ensure adequate operation at all flight conditions.

The present invention seeks to provide a nacelle for a gas turbine engine which improves the air intake flow distribution at all flight conditions resulting in more efficient operation whilst reducing the drag on the external cowl surfaces.

According to the present invention a nacelle comprises a first cowling for a gas turbine engine, said first cowling having an air intake forward of said gas turbine engine and defining an air passage for directing a flow of air to the gas turbine engine, and a second cowling upstream of said first cowling also defining an air passage therethrough, the first and second cowlings being arranged so that the air passage in each of the cowlings are in series flow relationship with one another to allow the passage of flow of air to said gas turbine engine, the second cowling being in a spaced apart relationship with the first cowling to define a further air passage therebetween, the further air passage allowing an additional flow of air therethrough which ensures a satisfactory air flow distribution at all engine operating conditions.

The further air passage can be varied to change the effective area thereof. Preferably the effective area of the further air passasge is varied by pivotable movement of a downstream portion of said second cowling. The extent of the pivotable movement of the downstream portion of said second cowling may be controlled by a pressure sensing device.

The air passages defined in either or both of the cowlings may also be varied to change the effective areas thereof.

Preferably the second cowling is of cambered aerofoil cross-section and may be tapered longitudinally.

The second cowling may be in a coaxial radially spaced apart relationship with the first cowling.

The present invention will now be described by way of example and with reference to the accompanying drawings in which, FIG. 1 is a diagrammatic view of a gas turbine engine having an air intake in accordance with the present invention and showing the airflow therethrough when the engine is operating at cruise condition.

FIG. 2 is a diagrammatic view of a gas turbine engine having an air intake in accordance with the present invention and showing the airflow therethrough when the engine is throttled back from cruise.

FIG. 3 is a diagrammatic view of a gas turbine engine having an air intake in accordance with the present invention and showing the airflow therethrough when the engine is ground run ie. when the associated aircraft is stationary.

In FIGS. 1-3, the same reference numerals have been used for integers which are common to all the drawings. Referring to FIG. 1, a gas turbine engine is generally indicated at 10. The engine 10 comprises a core gas generator 12 which has a stage of fan blades 14 mounted at its upstream end. The fan blades 14 are contained within a engine cowling 16. The engine cowling 16 is supported in a coaxial spaced apart relationship with the gas generator 12 by means of a plurality of struts 15 spaced circumferentially around the gas generator 12. The engine cowling 16 extends in a upstream direction to a position beyond the fan stage 14 and defines a main air intake 20.

At the upstream end of the engine cowling 16 and displaced therefrom is a further cowling 22. The cowling 22 extends upstream of the engine cowling 16 and defines a further air intake 24 which is in fluid communication with the main air intake 20 in the engine cowling 16. In operation air is drawn through the air intake 24 and passes through the air intake 20 to both the fan stage 14 and the gas generator 12.

The cowling 22 is of cambered aerofoil cross-section and tapers from its upstream end 26 to become thinner at its downstream end 28 adjacent the engine cowling 16. The cowling 22 is radially spaced apart from the engine cowling 16 and is fixed in this position. The downstream end 28 of the cowling 22 is supported in a coaxial spaced apart relationship with the upstream end 19 of the engine cowling 16 to define a passageway therebetween.

The cowling 22 may be supported from the engine cowling 16 by struts extending through the passageway 30. However in the preferred embodiment of the present invention the cowling 22 is mounted independently of the engine cowling 16. This latter arrangement has the advantage that any strut problems will be eliminated and that engine changes will not necessitate the removal of the cowling 22. Preferably the cowling 22 is an integral part of the aircraft (not shown) on which the gas turbine engine 10 is to be mounted. The cowling 22 can then be designed to suit several different engine manufacturers installations.

In operation when the gas turbine engine 10 is at cruise condition, air is drawn through the air intake 24 into the cowling 22 in directions shown by the arrows A in FIG. 1. The airflow through the air intake 24 is greater than the engine airflow requirement of the engine 10 when at cruise. The engine 10 therefore only receives the high energy core region of the air taken through the air intake 24. The high energy core region of the intake air is drawn through the intake 24 and passes through the intake 20 in the engine cowling 16 to both the fan stage 14 and the gas generator 12 in the directions indicated by arrows A in FIG. 1. As the engine 10 only receives the high energy core region of the airflow through the intake 24 this results in improved efficiency of the engine 10.

The external drag of the cowling 22 depends upon the size of the streamtube, indicated by the interrupted lines C in FIG. 1, approaching the upstream end 26 of the cowling 22. When the size of the streamtube C is equal or greater than the highlight area, which is the area of the intake 24 at the upstream end 26 of the cowling 22, the velocities over the external surface 23 are low. The low velocity of the airflow over the external surface 23 of the cowling 22 produces favourable pressure gradients along the surface 23 and reduces the external drag of the cowling 22.

The airflow drawn into the cowling 22 which is not required by the engine 10 passes out through the passageway 30 in a direction indicated by the arrows B in FIG. 1. The excess airflow passes out through the passageway 30 and is directed along the outer surface 18 of the engine cowling 16. By correct sizing of the exit area from passageway 30 and the highlight area of the upstream end 26 of the cowling 22, the additional flow through the passageway 30 increases the size of the streamtube C of the flow entering the intake 24 of the cowling 22. The velocities of the airflow over the external surface 23 of the cowling 22 are lowered and produce more favourable pressure gradients hence further reducing the external drag of the cowling 22.

Movement of the downstream edge 28 of the cowling 22, to increase the exit area of the passageway 30, further increases the amount of air taken in to the intake 24. The downstream edge 28 of the cowling 22 can be moved from the position shown in full lines either axially or pivotally.

An actuator mechanism (not shown) is provided to move the downstream endge 28 of the cowling 22. The extent of the pivotable movement of the downstream edge 28 of the cowling 22 is controlled by a pressure sensing device. The pressure sensing device determines the pressure differential $\Delta P$, between the pressure, $P_{23}$, on the outer intake lip surface 23 and the pressure $P_{21}$, on the inner intake lip surface 21, at a predetermined position on the cowling 22.

If the pressure differential falls below a desired operating level the downstream edge 28 of the cowling 22 is moved by the actuator to the position shown by interrupted lines in FIG. 1. This opens up the effective area of the passageway 30 and restores the pressure differential to its normal operating level. The additional air flow through the passageway 30 increases the streamtube size sufficiently to provide favourable pressure gradients on the external surface 23 of the cowling 22 providing significant external drag reductions.

Similarly if the pressure differential $\Delta P$, exceeds the desired operating level the downstream edge 28 of the cowling 22 is moved to reduce the effective area of the passageway 30 which restores the pressure differential to its normal operating level.

When the engine is throttled back, as shown in figure 2, the amount of airflow the engine 10 demands is reduced. The size of the streamtube C is reduced and is less than the highlight area of the intake 24. The air not required has to spill over the upstream end 26 of the cowling 22 and flows along the external surface 23. This airflow has high local velocities as it spills over the upstream end 26 of the cowling 22. The high local velocities of the airflow over the upstream end 26 produces less favourable pressure gradients along the external surface 23 of the cowling 22 increasing the external drag.

However by correct sizing of the of the exit area from the passageway 30 the airflow entering through the main intake 24 of the cowling 22 and flowing out through the passageway 30 will be increased. The increase in airflow through the passageway 30 is due to a reduction in the static pressure at the exit of the passageway 30. As the airflow requirement of the engine 10 is reduced the ratio of the total airflow entering the intake 24 of the cowling 22 (A+B) to the engine airflow requirement (A) increases and the reductions in the external drag will be greater than for the case of the engine 10 at cruise.

The external drag can be reduced still further by increasing the exit area of the passageway 30. The effective exit area of the passage way 30 is increased by movement of the downstream end 28 axially or to the position indicated by interrupted lines in FIG. 2.

Nacelle specifications further require that the airflow must not separate from the outer surface 23 at the upstream end 26 of the cowling 22 when the airframe is travelling at low speeds and very high incidence with an inoperative engine. When the engine is inoperative the engine airflow requirement reduces still further. However the airflow through the passageway 30 increases the size of the streamtube into the intake 24. This reduces the amount of air that needs to spill over the upstream edge of the cowling 22. Reducing the amount of spillage reduces the local velocities of the airflow over the upstream end 26 and produces more favourable pressure gradients. The reduction in the amount of air that needs to spill over the upstream end 26 of the cowling 22 leads to a significant improvement in the incidence attainable before the airflow separates from the outer surface 23.

When the engine 10 is ground run ie. when the associated aircraft is stationary, air is drawn into the air intake 20 in the engine cowling 16 through both the air intake 24, in a direction indicated by the arrows A in FIG. 3, and through the passageway 30, in a direction indicated by arrows B in FIG. 3. The airflow entering through the passageway 30 is assisted into the air intake 20 in the engine cowling 16 by the airflow coming through the air intake 24.

The airflow entering through the passageway 30 supplements the airflow passing through the air intake 24 to meet the airflow demands of the engine 10. The flow of air through the passageway 30 means that less air has to be taken through the air intake 24 in the cowling 22. The reduced flow of air through the air intake 24 together with the size of the intake 24, reduce the local velocities of the airflow over the upstream end 26 of the cowling 22. The lower velocities of the airflow drawn into the intake 24 over the upstream end 26 of the cowling 22 produces more favourable pressure gradients on the internal surface 21 at the upstream end 26 of the cowling 22 compared to a conventional intake. This can provide a higher internal intake efficiency for the intake 24 and the lower velocities further reduce the likelihood of foreign object ingestion into the engine 10 during ground running. Alternatively the forward facing area of the upstream end 26 of the cowling 22 can be significantly reduced to maintain the higher local velocities of the airflow over the upstream end 26 that are experienced by conventional intakes. The reduction in the forward facing area of the upstream end 26 of the cowling 22 helps to keep the external maximum section size down with associated reductions in external drag.

The amount of airflow passing through the passageway 30 into the intake 20 can be varied to control the airflow therethrough by movement of the downstream end of the the cowling 22 either axially or to the position indicated by the interrupted lines in FIG. 3. The axial movement of the downstream end of the cowling 22 can be used to open up an auxiliary intake along the cowl for further improvements in the ground run engine performance.

When gas turbine engines are used in adverse weather conditions ice may build up on the nacelle. With conventional nacelles the ice builds up on the upstream end of the engine cowling adjacent the air intake and this ice can be drawn into the engine. A nacelle in accordance with the present invention offers the further advantage that should any ice build up on the upstream end 26 of the cowling 22 it will be drawn through the air intake 24 and exit through the annular passageway 30 away from the engine.

It will be appreciated by one skilled in the art that although the present invention has been described with reference to fixed air intakes 20 and 24, that it is equally applicable to intakes which are variable should additional entry area for the airflow be required.

I claim:

1. A nacelle comprising a first cowling for a gas turbine engine, said first cowling having an air intake forward of said gas turbine engine for directing a flow of air to the gas turbine engine, and a second cowling upstream of said first cowling also having an air intake forward of the gas turbine engine, the first and second cowlings being arranged so that the air intakes in each of the cowlings are in series flow relationship with one another to allow the passage of flow of air to said gas turbine engine, the second cowling being in a spaced apart relationship with the first cowling to define an air passage therebetween, the air passage between the first and second cowlings allowing an additional flow of air therethrough at all engine operating conditions to ensure a satisfactory air flow distribution to the engine.

2. A nacelle as claimed in claim 1 in which the air passage between the first and second cowlings can be varied to change the effective area thereof.

3. A nacelle as claimed in claim 2 in which the further air passage between the first and second cowlings is varied to change the effective area thereof by pivotable movement of a downstream portion of said second cowling.

4. A nacelle as claimed in claim 3 in which the extent of the pivotable movement of the downstream portion of said second cowling is controlled by a pressure sensing device.

5. A nacelle as claimed in claim 1 in which the second cowling is of cambered aerofoil cross-section.

6. A nacelle as claimed in claim 1 in which the second cowling is tapered longitudinally.

7. A nacelle as claimed in claim 1 in which the second cowling is fixed in a coaxial spaced apart relationship with the first cowling.

8. A nacelle as claimed in claim 1 for use on an aircraft.

9. A nacelle as claimed in claim 8 in which the second cowling is an integral part of the aircraft on which the nacelle is used.

* * * * *